United States Patent [19]

Suzuki

[11] Patent Number: 5,517,246

[45] Date of Patent: May 14, 1996

[54] IMAGE PROCESSING APPARATUS AND METHOD, AND SYSTEM THEREOF

[75] Inventor: Shigeo Suzuki, Kawasaki, Japan

[73] Assignee: Canon Kabushiki Kaisha, Tokyo, Japan

[21] Appl. No.: 81,148

[22] Filed: Jun. 25, 1993

[30] Foreign Application Priority Data

Jun. 29, 1992 [JP] Japan ................... 4-170608

[51] Int. Cl.$^6$ ............................ H04N 7/36
[52] U.S. Cl. ......................... 348/412; 348/399
[58] Field of Search ..................... 348/399, 390, 348/384, 699, 426, 401, 409, 412

[56] References Cited

U.S. PATENT DOCUMENTS

| | | | |
|---|---|---|---|
| 4,667,233 | 5/1987 | Furukawa | 348/415 |
| 4,837,618 | 6/1989 | Hatori et al. | 348/401 |
| 5,166,987 | 11/1992 | Kageyama | 358/426 |
| 5,241,381 | 8/1993 | Kondo | 348/390 |

FOREIGN PATENT DOCUMENTS

| | | | |
|---|---|---|---|
| 330455 | 8/1989 | European Pat. Off. | H04N 7/137 |
| 397206 | 11/1990 | European Pat. Off. | H04N 7/137 |

*Primary Examiner*—Tommy P. Chin
*Assistant Examiner*—A. Au
*Attorney, Agent, or Firm*—Fitzpatrick, Cella, Harper & Scinto

[57] ABSTRACT

An image processing system determines a characteristic of a moving picture, when moving-picture information is compressed, by comparing the contents of contiguous frames comprising the moving picture. The characteristic can be such that the background is not moving, but a part of the picture is moving. A compression method is selected in accordance with the characteristic and used to compress the image data. The compressed data includes the image data and information for designating the procedure to decompress the image data. When the receiver receives the compressed image data, data expansion processing is performed based on the information indicating the compression procedure. Since the image processing system compresses the image by the compression procedure best suited to the characteristic of the image, information is not lost and efficient compression can be performed.

16 Claims, 4 Drawing Sheets

IMAGE PROCESSING APPARATUS AND METHOD, AND SYSTEM THEREOF

BACKGROUND OF THE INVENTION

The present invention relates to an image processing apparatus and method, and system thereof which records or transfers moving-picture information, and reproduces the recorded or transferred information.

Conventionally, the above image processing apparatus compresses a frame or a plurality of frames comprising moving-picture information by a predetermined single type of compression method, and records or transfers the compressed information. Then, the recorded or transferred information is returned to as before in accordance with the method that the information has been compressed.

However, in the conventional technique, when the compression method is not suitable to all or a part of the moving-picture information, a problem arises in that necessary information is lost during the compression or the compression rate is insufficient.

For example, when the compression is performed by thinning frames of the moving picture, this method is suitable to an inactive moving picture, however, the reproducibility of an active moving picture is inferior. On the other hand, when the compression is performed by recording the difference between frames, this method is suitable to active moving picture, while the compression efficiency for inactive moving picture is insufficient.

SUMMARY OF THE INVENTION

Accordingly, in light of the above problems, it is an object of the present invention to provide an image processing apparatus and method, and system thereof having a mechanism such that image information is efficiently compressed, recorded, and transferred without losing necessary image information.

According to the present invention, the foregoing object is attained by an image processing apparatus comprising: input means for inputting image information; determination means for determining a characteristic of the image information; selection means for selecting a compression procedure from multiple compression procedures which is suitable to the characteristic of the information; compression means for compressing the image information by the compression procedure selected by the selection means; and output means for outputting the image information compressed by the compression means.

According to the present invention, the foregoing object is attained by an image processing apparatus comprising: input means for inputting image information and information indicative of a procedure to decompress the image information; determination means for determining a procedure to decompress the image information based on the information indicative of the procedure which is inputted from the input means; decompression means for decompressing the image information based on the result of determination by the determination means and reproducing the image information before the compression; and output means for outputting the image information which is expanded by the decompression means.

According to the present invention, the foregoing object is attained by an image processing method comprising: input step for inputting image information; determination step for determining a characteristic of the image information; selecting step for selecting a compression procedure which is suitable to the characteristic of the information determined by the determination step; compression step for compressing the image information by the compression procedure selected by the selection step; and output step for outputting the image information compressed by the compression step.

According to the present invention, the foregoing object is attained by an image processing method comprising: input step for inputting image information and information indicative of a procedure to decompress the image information; determination step for determining a procedure to decompress the image information based on the information indicative of the procedure which is inputted from the input step; decompression step for expanding the image information based on the result of determination by the determination step and reproducing the image information before the compression; and output step for outputting the image information which is decompressed by the decompression step.

According to the present invention, the foregoing object is attained by an image processing system comprising: a transmission-side image processing apparatus including: input means for inputting image information; determination means for determining characteristic of the image information; compression means for selecting a compression procedure which is suitable to the characteristic of the information; and output means for outputting the image information compressed by the compression means; and a reception-side image processing apparatus including: input means for inputting the information which is outputted from the output means; decompression means for decompressing the image information based on the information indicative of the procedure inputted by the input means and reproducing the image information before the compression; and output means for outputting the image information decompressed by the decompression means.

According to the present invention, the foregoing object is attained by an image processing apparatus comprising: input means for inputting moving-picture information including a plurality of frames; processing means for obtaining a difference between contiguous frames of the moving-picture information; determination means for determining a characteristic of the moving-picture information based on the difference obtained by the processing means; first compression means for compressing the moving-picture information by using the difference of the frames obtained by the processing means; second compression means for compressing the moving-picture information by a compression procedure which is different from the first compression means; selection means for selecting the first or second compression means in accordance with the characteristic determined by the determination means; and control means for controlling so as to compress and output the moving-picture information by the compression means selected by the selection means.

According to the present invention, the foregoing object is attained by an image processing method comprising: input step for inputting moving-picture information including a plurality of frames; processing step for obtaining a difference between contiguous frames of the moving-picture information; determination step for determining a characteristic of the moving-picture information based on the difference obtained by the processing step; first compression step for compressing the moving-picture information by using the difference of the frames obtained by the processing step; second compression step for compressing the moving-picture information by a compression procedure which is different from the first compression step; selection step for selecting the first or second compression step in accordance with the characteristic determined by the determination step; and control step for controlling so as to compress and output the moving-picture information by the compression means selected by the selection step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

Construction of the System

Figure 1:
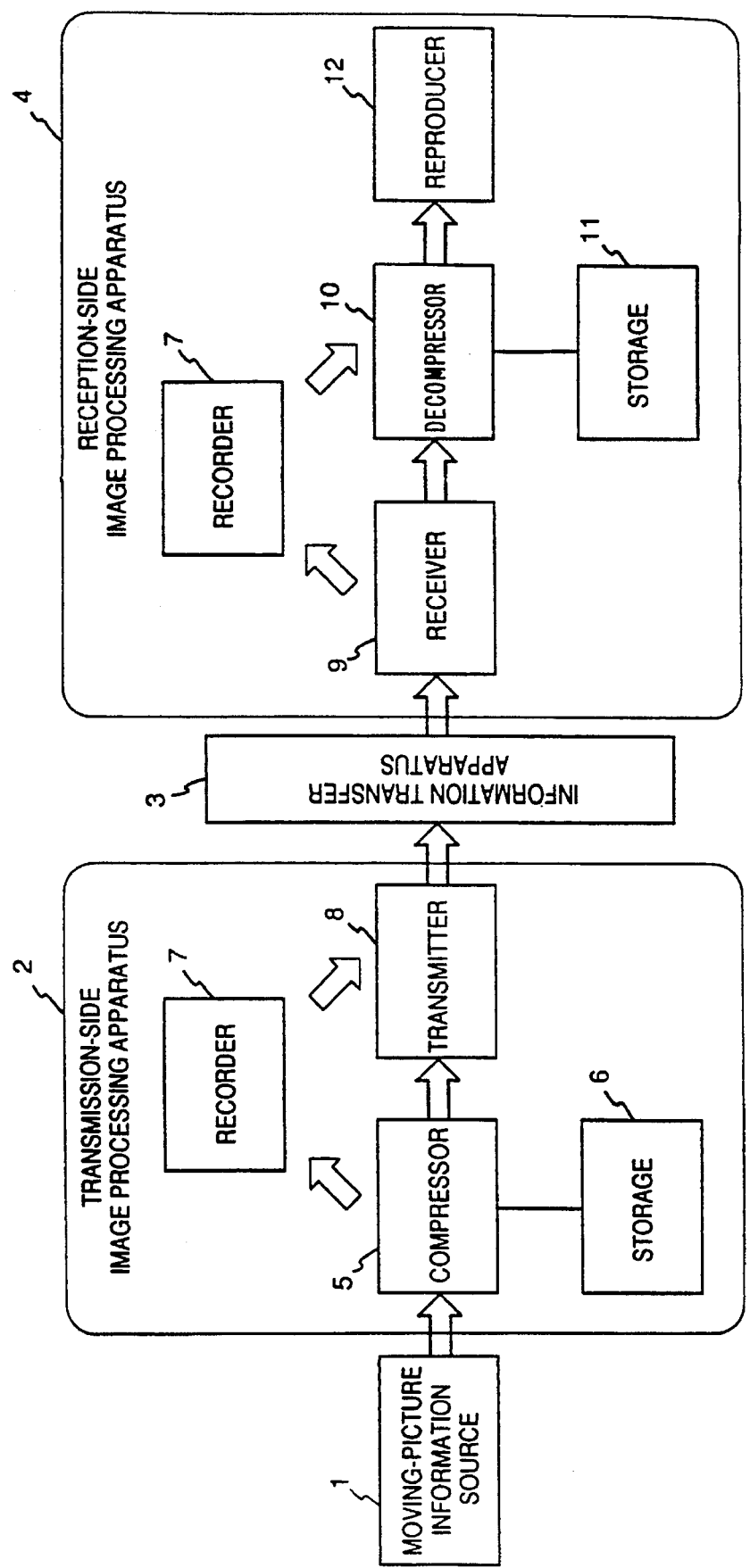
FIG. 1 is a block diagram showing the construction of an image transfer system of an embodiment of the present invention.

FIG. 1 is a block diagram of an image transfer system of the present embodiment. In FIG. 1, a moving-picture information source 1 generates a moving-picture information which is subjected to the processing. A transmission-side image processing apparatus 2 compresses and transmits the moving-picture information. An information transfer apparatus 3 is an apparatus which transfers information, e.g. LAN (Local Area Network). A reception-side image processing apparatus 4 receives and decompresses the compressed information and reproduces a moving picture. Furthermore, the transmission-side and reception-side image processing apparatuses are respectively constructed as following.

In the transmission-side image processing apparatus 2, the compressor 5 selects the most appropriate compression method for characteristic of each image scene inputted from the moving-picture information source 1 and executes the compression processing. A storage 6 stores a plurality of procedures of compression methods which are selected and executed by the compressor 5. A recorder 7 records the compressed image information (including the information concerning the selected compression method) on a magnetic disk. A transmitter 8 transmits the image information which is processed by the compressor 5.

In the reception-side image processing apparatus 4, a receiver 9 receives the image information which is transmitted via the information transfer apparatus 3. An decompressor 10 selects the decompression method corresponding to the received moving-picture information and executes the processing. A storage 11 stores a plurality of decompression methods which are selected and executed by the decompressor 10. A reproducer 12 reproduces an original moving picture before the compression from the decompressed image. Furthermore, the recorder 7 records the compressed information in the same way as the transmission side.

Explanation for Compression and Expansion Processings

In the image transfer system with the construction described above, the moving picture is transferred and reproduced as follows.

The moving-picture information inputted from the moving-picture information source 1 is inputted to the transmission-side image processing apparatus 2 and compressed by the compressor 5. At this time, the compressor 5 selects the most appropriate compression method from the compression methods stored in the storage 6 in accordance with the characteristic of the moving-picture information. For example, the storage 6 prepares two types of procedures. One is a compression procedure 1 to compress the information by thinning frames. The other is a compression procedure 2 to compress the information by determining the information of the frame which is contiguous to/different from the frame of a first picture as difference information.

Figure 3:
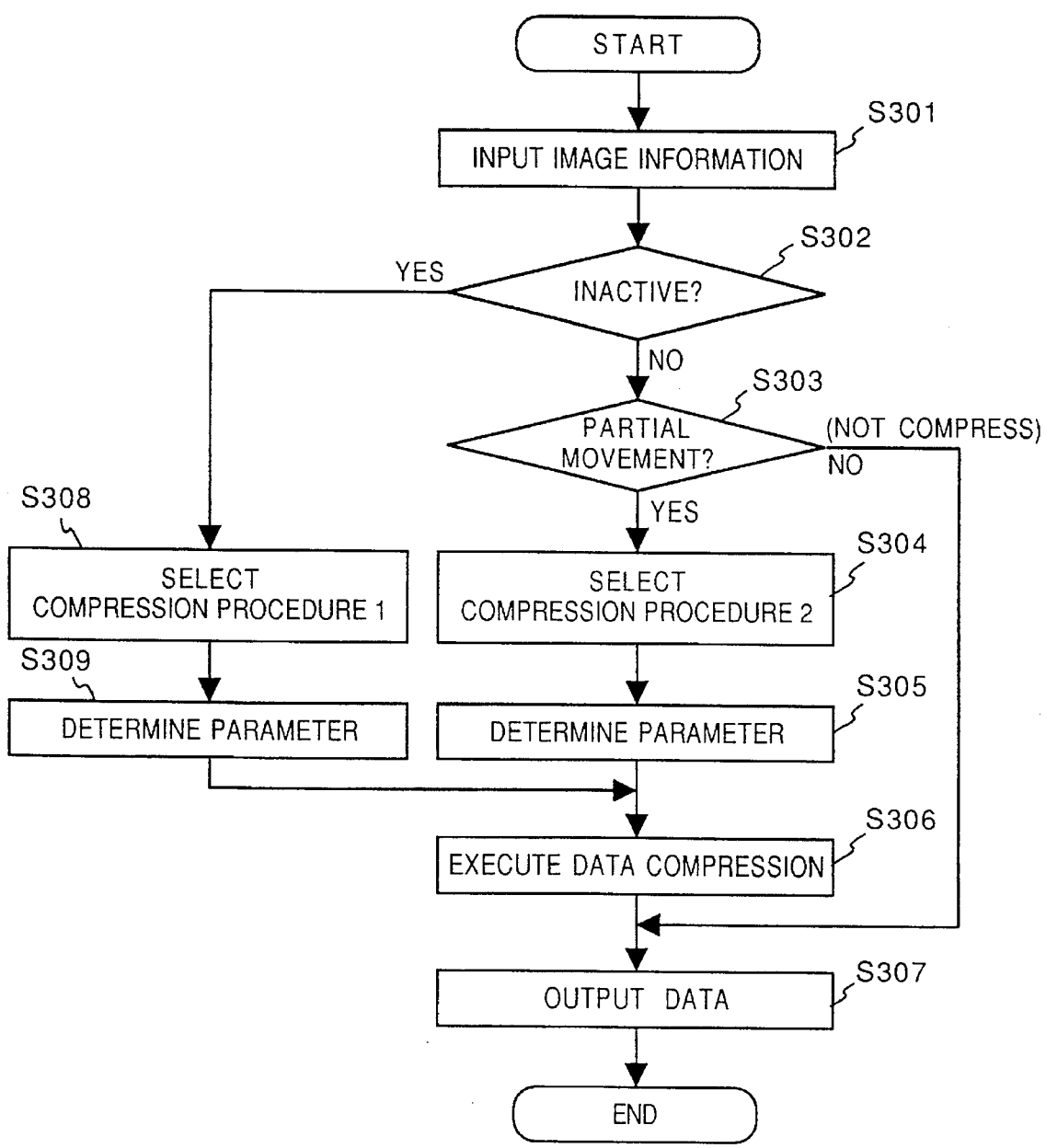
FIG. 3 is a flowchart of the operation of an information compression.

The operation of the moving-picture processing by the compressor 5 is explained by the flowchart of FIG. 3.

At step S301, when the moving-picture information is received from the moving-picture information source 1, the movement of the moving picture is examined at step S302. When the image is inactive, since there is less problem in thinning the frames comprising the moving picture, the process proceeds to step S308 where the compressor 5 selects the compression procedure 1 from the storage 6. When the procedure is determined, a parameter indicative of the ratio for thinning the frames is determined at step S309. This compression method is well known and the parameter is determined by a well-known method. When the image is active, the process proceeds to step S303 where characteristic of the movement is determined. Furthermore, when the moving picture is such that an object is moving over the background which is inactive, only the information of the moving object is needed. Therefore, the compression procedure 2 is selected at step S304. In this case also, the parameter indicating the number of frames compressed is determined at step S305.

When it is determined that the moving picture is not appropriate for both procedures, the information is not compressed.

Accordingly, when the compression procedure is determined, the information is compressed at step S306 in accordance with the selected procedure. The storage 6 can be a memory storing the program which executes the determined procedure or electric circuit. In the former case, the compressor 5 reads out the program which executes the selected procedure from the storage 6 and the processor processes the image information as data. In the later case, the selected circuit is activated, the image data is inputted to the circuit, and the compression processing is executed.

Selection of the compression method of steps S302 to S303 can be performed by a user by monitoring the moving picture. However, in this embodiment, the transmission-side image processing apparatus 2 automatically performs the selection as following.

For selection of a compression procedure, at the start of the compression of the moving picture, a difference between the frames for a predetermined number of frames of the moving picture which is subject to the compression is respectively obtained for each pixel by the compression procedure 2. For example, on the obtained differences, the number of the pixels whose difference is not zero and the sum of the differences of each pixel in a frame are examined, i.e., checked. When the sum of the differences of each pixel concerning to the predetermined number of frames (or over the predetermined number of frames) is less than a first threshold, the difference between the frames is small. That is, the movement is inactive and the image is compressed by the compression procedure 1 that is thinning a frame. On the other hand, when the number of pixels whose the difference is not zero is less than a second threshold, the difference between the frames is limited to a partial area of the frame. That is, only partial area is regarded as active and the image is compressed by the compression procedure 2. Furthermore, in other cases, the image is regarded as considerably active and recorded without compression. Furthermore, the parameter indicative of thinning intervals in the compression procedure 1 can be determined in accordance with the difference value. Still further, the first and second thresholds can be set by the user.

An example for selecting a compression procedure at the start of the compression is described above. Then, an example of dynamically changing the compression procedure in accordance with the change of the state of moving picture is described below.

It is assumed that the compressor 5 performs compression by the compression procedures 1 and 2 in parallel. When the compression is performed by using a program, a processor executes a plurality of programs simultaneously. When the compression is performed by each dedicated circuit, the moving-picture information is inputted into the circuits and compressed in parallel. Accordingly, the result of compression corresponding to the selected compression procedure is selected and recorded.

Selection of the compression procedure is performed as following. The difference between the frames obtained by the compression procedure 2 is determined. If the difference is smaller than a predetermined threshold for a predetermined number of frames continuously, the result of the compression procedure 1, that is thinning a frame, is selected. If the difference is larger than the predetermined threshold, the result of the compression procedure 2 is selected. If the difference is continuously larger than the threshold, compression is not performed. The difference and threshold can be compared whenever the difference is obtained, or once in a predetermined number of operations, or in a predetermined duration.

It can be arranged so that the difference between frames is obtained only to examine the change of the image, which is independent to the compression procedure, by using a coding method without using the difference between the frames. In this case, the selection method of the compression procedure can be simplified. That is, one of two compression procedures can be selected by a threshold with respect to the sum of the difference of each pixel. Furthermore, it can be arranged so that when the difference is greater than a considerably large threshold value, compression is not performed.

At step S307, the compressed image information is outputted from the compressor 5 and inputted to the transmitter 8.

Figure 2:
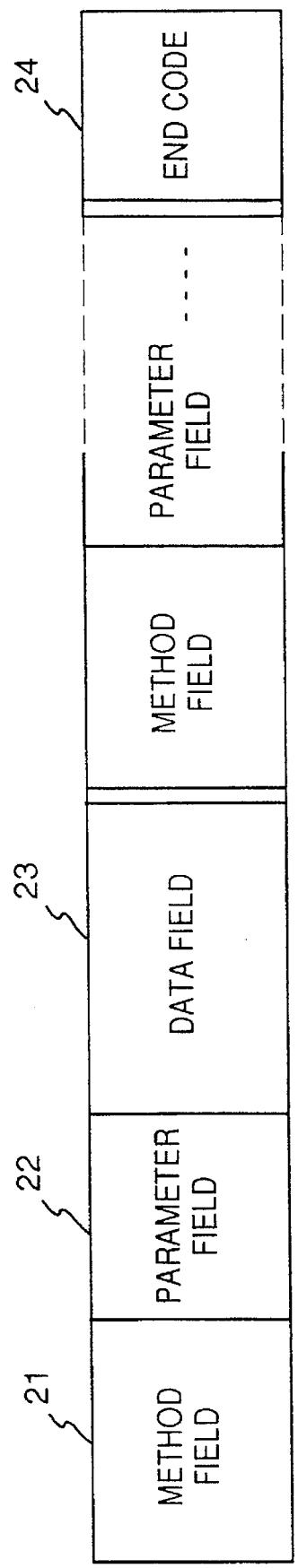
FIG. 2 is a diagram illustrating a data format when a compressed moving-picture information is recorded/transferred.

FIG. 2 is a diagram illustrating a data format of the data of the compressed moving-picture information at recording or transferring. Concerning the data whose compression method and parameter are the same, a method field 21, parameter field 22, and data field 23 are grouped into one, and this arrangement is repeated until the image information is all formatted. The data format ends with an end code 24.

In this data, the information indicating the procedure to decompress the data stored in the data field 23 is stored in the method field 21. For example, when frames are thinning out as a compression method, a processing which compensates the thinned-out frames is designated in the method field 21 as a decompression method. When only the difference information between frames is taken out from the image, the common portion with the previous frame is taken out and the processing to compensate by the difference information is designated. Information indicating that a decompression processing is not necessary on the image which is not compressed is stored in the method field 21. These designations can be performed by coding each compression method and designating the code. The parameter field 22 stores the information indicative of a parameter value required for the decompression processing. When a compression method is to thin out frames, the parameter value is a value which designates if a frame is thinned out every other frame or every two frames. The most appropriate parameter value which is suitable to the characteristic of the moving picture is selected in the same way as the selection of the compression method and stored in the parameter field 22. The data field 23 stores the compressed moving-picture data which is decompressed by the decompression method indicated by the method field 21.

The moving-picture information compressed by the compressor 5 can be directly transmitted by the transmitter 8, or once stored in a recording medium such as memory, disk, or tape by the recorder 7 and read out and transmitted from the recording medium. The compressed moving-picture information which is transmitted from the transmitter 8 is received by the receiver 9 of the reception-side image processing apparatus 4 via the information transfer apparatus 3. After the reception, the decompression processing can be immediately performed by the decompressor 10, or the information can be once stored in the recording medium by the recorder 7, and then the decompression processing can be performed.

Figure 4:
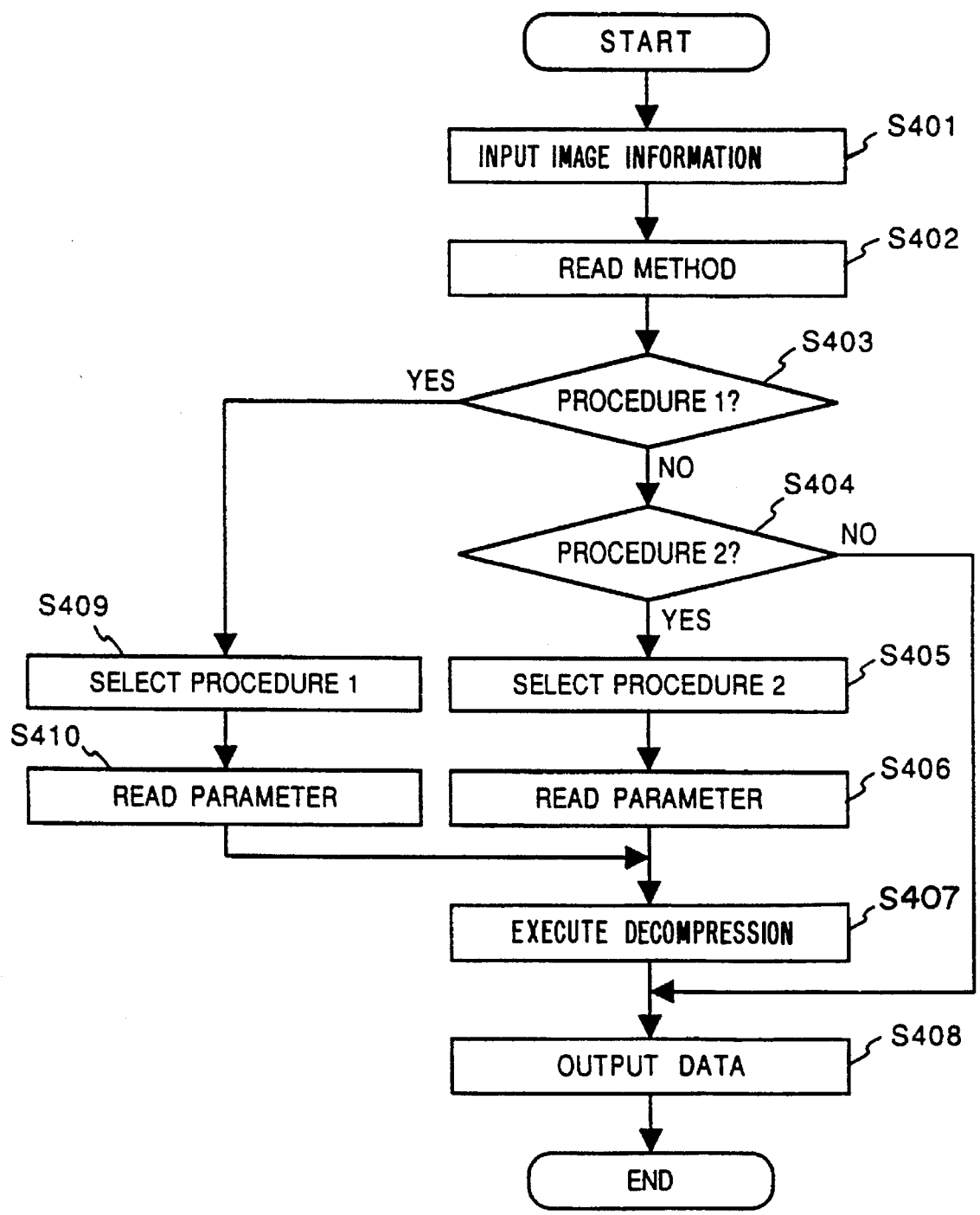
FIG. 4 is a flowchart of the operation of an information expansion.

The reception-side image processing apparatus 4 receives the compressed image information, the decompression processing is performed on it, and a moving picture is reproduced. The procedure is described along with the flowchart of FIG. 4.

At step S401, the decompressor 10 receives the compressed moving-picture information in the format of FIG. 2. At step S402, the method field 21 is read out of the information and the decompression method corresponding to the content of the method field 21 is selected from the storage 11. The decompression method stored in the storage 11 at least includes an decompression method corresponding to the compression method stored in the storage 6. Means for executing this decompression method can be such that the decompressor 10 selectively reads and executes the program stored in the memory. An decompression processing which is executed by appropriately connecting the decompression procedure prepared in a hardware such as an electric circuit can be considered. Note that the compression procedures 1 and 2 correspond to decompression procedures 1 and 2 respectively.

The content of the method field is tested at step S403.

If the information written in the method field is the procedure 1, the process proceeds to step S409 where the decompression procedure 1 is selected so as to execute the procedure 1. If the written information is the procedure 2, the process proceeds to step S405 where the decompression procedure 2 is selected. In neither case, it is determined that the received data is not compressed and the decompression processing is not performed.

When the decompression method is determined, the parameter field 22 is read at step S410 or S406 and a parameter value is obtained in accordance with each decompression method when the processing by the selected decompression method is executed. At step S407, the data field 23 is read and the decompression processing is performed by using the decompression method selected by the previous step and the parameter value with respect to the data. As a result of the decompression processing, the moving-picture information is returned to an original form (an original moving-picture) before the compression and the information is transferred to the reproducer 12 at step S408. The reproducer 12 reproduces the moving-picture information transferred from the decompressor 10 and the reproduced picture is displayed on a CRT display and the like.

Accordingly, the moving picture inputted from the moving-picture information source 1 is reproduced through the compression and decompression processings. The above processings are repeated until the end code 24 is read out.

Furthermore, a single moving picture can be compressed by a single type of compression method or the compression processing can be performed by changing an arbitrary frame such as a scene whose characteristic of the moving picture has been changed. Information can be transferred from the transmission-side image processing apparatus 2 to the reception-side image processing apparatus 4 via a detachable medium (such as a flexible disk) recorded by the recorder 7 of the transmission-side image processing apparatus 2 and data can be read out of the media and reproduced in the reception side.

As described above, a plurality of compression/decompression methods are prepared in the transmission-side and reception-side apparatuses beforehand, an information compression procedure and parameter which are suitable to the characteristic is selected to compress an moving picture, whenever the characteristic of the inputted moving picture has been changed. Furthermore, for the reproduction, information loss caused by compression is prevented and a moving picture which is faithful to the master picture can be reproduced by the decompression procedure in accordance with the compression procedure of the received data.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

input means for inputting moving-picture information including a plurality of frames;

processing means for obtaining a difference between successive frames on each pixel of the moving-picture information;

summation means for obtaining the sum of the difference between the successive frames on each pixel;

thinning means for thinning out frames of the input moving-picture information;

determination means for determining whether the sum of the difference obtained by said summation means is less than a threshold;

output means for outputting compressed information for the input moving-picture information; and control means for controlling said output means so as to output moving-picture information thinned out by said thinning means as the compressed information where the sum of the difference is determined to be less than the threshold by said determination means and so as to output the difference obtained by said processing means as the compressed information where the sum of the difference is determined not to be less than the threshold by said determination means, wherein said processing means and said thinning means process the same moving-picture information simultaneously, and said control means controls said output means to select one of the results of processing by said processing means and said thinning means as the output.

2. The image processing apparatus according to claim 1, wherein said output means outputs the compressed moving-picture information and information indicative of a decompression procedure to decompress the compressed moving-picture information.

3. The image processing apparatus according to claim 1, wherein said output means outputs the information to a transmission path.

4. The image processing apparatus according to claim 1, wherein said output means writes the information into a recording medium.

5. The image processing apparatus according to claim 1, wherein the apparatus executes determination by said determination means periodically during the input of a moving-picture information from said input means, and dynamically executes selection by said output means corresponding to the result of determination of said determination means.

6. An image processing method comprising:

input step for inputting moving-picture information including a plurality of frames;

processing step for obtaining a difference between successive frames on each pixel of the moving-picture information;

summation step for obtaining the sum of the difference between the successive frames on each pixel;

thinning step for thinning out frames of the input moving-picture information;

determination step for determining whether the sum of the difference obtained by said summation step is less than a threshold;

output step for outputting compressed information for the input moving-picture information; and control step for controlling said output step so as to output moving-picture information thinned out by said thinning step as the compressed information where the sum of the difference is determined to be less than the threshold by said determination step and so as to output the difference obtained by said processing step as the compressed information where the sum of the difference is determined not to be less than the threshold by said determination step, wherein said processing step and said thinning step process the same moving-picture information simultaneously, and said control step controls said output step to select one of the results of processing by said processing step and said thinning step as the output.

7. The image processing method according to claim 6, wherein the method executes determination at said determination step periodically during the input of a moving-picture information from said input step, and dynamically executes selection at said output step corresponding to the result of determination at said determination step.

8. An image processing apparatus comprising:

input means for inputting moving-picture information including a plurality of frames;

processing means for obtaining a difference between successive frames on each pixel of the moving-picture information;

summation means for obtaining the sum of the difference between the successive frames on each pixel;

checking means for checking the number of pixels on which the difference between the successive frames is not zero;

thinning means for thinning out frames of the moving-picture information;

first determination means for determining whether the sum of the difference obtained by said summation means is less than a first threshold;

second determination means for determining whether the number checked by said checking means is less than a second threshold;

output means for outputting compressed information for the input moving-picture information; and controlling means for controlling said output means so as to output moving-picture information thinned out by said thinning means as the compressed information where the sum of the difference is determined to be less than the first threshold by said first determination means and so as to output the difference obtained by said processing means as the compressed information where the sum of the difference is determined not to be less than the first threshold by said first determination means and the number is determined to be less than the second threshold by said second determination means, wherein said processing means and said thinning means process the same moving picture information simultaneously, and said control means for controlling said output means to select one of the result of processing by said processing means and said thinning means as the output.

9. The image processing apparatus according to claim 8, wherein said output means outputs the compressed moving-picture information and information indicative of an decompression procedure to decompress the compressed moving-picture information.

10. The image processing apparatus according to claim 8, wherein said output means outputs the information to a transmission path.

11. The image processing apparatus according to claim 8, wherein said output means writes the information into a recording medium.

12. The image processing apparatus according to claim 8, wherein the apparatus executes determination by said determination means periodically during the input of a moving-picture information from said input means, and dynamically executes selection by said output means corresponding to the result of determination of said determination means.

13. An image processing system comprising:

a transmission-side image processing apparatus including:

first input means for inputting moving-picture information including a plurality of frames;

processing means for obtaining a difference between successive frames on each pixel of the moving-picture information;

summation means for obtaining the sum of the difference between the successive frames on each pixel;

thinning means for thinning out frames of the moving-picture information;

determination means for determining whether the sum of the difference obtained by said summation means is less than a threshold;

first output means for outputting the compressed moving-picture information and information indicative of a decompression procedure to decompress the compressed moving-picture information; and control means for controlling said first output means so as to output moving-picture information thinned out by said thinning means as the compressed information where the sum of the difference is determined to be less than the threshold and so as to output the difference obtained by said processing means as the compressed information where the sum of the difference is determined not to be less than the threshold by said determination means; and a reception-side image processing apparatus including:

second input means for inputting the information which is output from said first output means;

decompression means for decompressing moving-picture information based on the information indicative of the procedure input by said second input means and reproducing the moving-picture information before the compression; and second output means for outputting the moving-picture information decompressed by said decompression means, wherein said processing means and said thinning means process the same moving picture information simultaneously, and said control means controls said first output means to select one of the results of processing by said processing means and said thinning means as the output.

14. An image processing system comprising:

a transmission-side image processing apparatus including:

an image processing apparatus comprising:

first input means for inputting moving-picture information including a plurality of frames;

processing means for obtaining a difference between successive frames on each pixel of the moving-picture information;

summation means for obtaining the sum of the difference between the successive frames on each pixel;

checking means for checking the number of pixels on which the difference between the successive frames is not zero;

thinning means for thinning out frames of the moving-picture information;

first determination means for determining whether the sum of the difference obtained by said summation means is less than a first threshold;

second determination means for determining whether the number checked by said checking means is less than a second threshold;

first output means for outputting the compressed moving-picture information and information indicative of a decompression procedure to decompress the compressed moving-picture information; and control means for controlling said first output means so as to output moving-picture information thinned out by said thinning means when the sum of the difference is determined to be less than the first threshold by said first determination means and so as to output the difference obtained by said processing means when the sum of the difference is determined not to be less than the first threshold by said first determination means and the number is determined to be less than the second threshold by said second determination means; and a reception-side image processing apparatus including:

second input means for inputting the information which is output from said first output means;

decompression means for decompressing moving-picture information based on the information indicative of the procedure input by said second input means and reproducing the moving-picture information before the compression; and second output means for outputting the moving-picture information decompressed by said decompression means, wherein said processing means and said thinning means process the same moving picture information simultaneously, and said control means controls said first output means to select one of the results of processing by said processing means and said thinning means as the output.

15. An image processing method comprising:

input step for inputting moving-picture information including a plurality of frames;

processing step for obtaining a difference between successive frames on each pixel of the moving-picture information;

summation step for obtaining the sum of the difference between the successive frames on each pixel;

checking step for checking the number of pixels on which the difference between the successive frames is not zero;

thinning step for thinning out frames of the input moving-picture information;

first determination step for determining whether the difference obtained at said summation step is less than a first threshold;

second determination step for determining whether the number checked at said checking step is less than a second threshold;

output step for outputting compressed information for the input moving-picture information; and controlling step for controlling said output step so as to output moving-picture information thinned out at said thinning step when the sum of the difference is determined to be less than the first threshold in said first determination step as the compressed information and so as to output the difference obtained at said processing step as compressed information when the sum of the difference is determined not to be less than the first threshold by said first determination step and the number is determined to be less then the second threshold in said second determination step, wherein said processing step and said thinning step process the same moving picture information simultaneously, and said control step for controlling said output step to select one of the results of processing by said processing step and said thinning step as the output.

16. The image processing method according to claim 15, wherein the method executes determination at said determination step periodically during the input of a moving-picture information from said input step, and dynamically executes selection at said output step corresponding to the result of determination at said determination step.

* * * * *

UNITED STATES PATENT AND TRADEMARK OFFICE
CERTIFICATE OF CORRECTION

PATENT NO. : 5,517,246
DATED : May 14, 1996
INVENTOR(S) : SHIGEO SUZUKI

It is certified that error appears in the above-indentified patent and that said Letters Patent is hereby corrected as shown below:

COLUMN 1

Line 62, "expanded" should read --decompressed--.

COLUMN 2

Line 14, "expanding" should read --decompressing--.

COLUMN 3

Line 63, "An" should read --a--.

COLUMN 4

Line 5, "Expansion" should read --Decompression--.
Line 60, "following." should read --follows.--

COLUMN 5

Line 8, "whose the" should read --whose--.
Line 11, "only" should read --only a--.
Line 22, "moving" should read --the moving--.
Line 34, "following." should read --follows.--

COLUMN 6

Line 51, "An" should read --A--.

UNITED STATES PATENT AND TRADEMARK OFFICE
CERTIFICATE OF CORRECTION

PATENT NO. : 5,517,246

DATED : May 14, 1996

INVENTOR(S) : SHIGEO SUZUKI

It is certified that error appears in the above-indentified patent and that said Letters Patent is hereby corrected as shown below:

COLUMN 7

Line 33, "is" should read --are--; and "an" should read --a--.

COLUMN 9

Line 42, "an" should read --a--.

Signed and Sealed this

Eighth Day of October, 1996

Attest:

BRUCE LEHMAN

*Attesting Officer*  *Commissioner of Patents and Trademarks*